(12) United States Patent
Carbajal De Nova

(10) Patent No.: US 10,296,983 B2
(45) Date of Patent: May 21, 2019

(54) HOW TO MODEL RISK ON YOUR FARM

(71) Applicant: Carolina Carbajal De Nova, Mexico City (MX)

(72) Inventor: Carolina Carbajal De Nova, Mexico City (MX)

(*) Notice: Subject to any disclaimer, the term of this patent is extended or adjusted under 35 U.S.C. 154(b) by 450 days.

(21) Appl. No.: 14/563,088

(22) Filed: Dec. 8, 2014

(65) Prior Publication Data

US 2016/0162996 A1 Jun. 9, 2016

(51) Int. Cl.
*G01R 21/00* (2006.01)
*G06Q 50/06* (2012.01)
*G06Q 40/00* (2012.01)

(52) U.S. Cl.
CPC ................... *G06Q 40/12* (2013.12)

(58) Field of Classification Search
CPC ............... G06Q 50/06; G06F 1/263
See application file for complete search history.

(56) References Cited

U.S. PATENT DOCUMENTS

| | | |
|---|---|---|
| 7,580,876 B1 | 8/2009 | Phillips |
| 7,599,870 B2 | 10/2009 | Merkoulovitch |
| 7,606,756 B2 | 10/2009 | Freund |
| 7,644,029 B2 | 1/2010 | Perg |
| 7,783,551 B1 | 8/2010 | Browne |
| 8,019,670 B2 | 9/2011 | Madhavan |
| 8,234,295 B2 | 7/2012 | Haas |
| 8,239,307 B2 | 8/2012 | Boscaljon |
| 8,249,970 B1 | 8/2012 | Phillips |
| 8,392,302 B2 | 5/2013 | Perg |
| 8,473,078 B1 | 6/2013 | Ybarra |
| 8,706,601 B1 | 4/2014 | Payne |
| 8,892,409 B2 | 11/2014 | Mun |
| 9,460,478 B2 * | 10/2016 | Zhang ................ G06Q 50/06 |
| 2004/0015376 A1 | 1/2004 | Zhu |

(Continued)

FOREIGN PATENT DOCUMENTS

| | | |
|---|---|---|
| CA | 2323425 A1 | 9/1999 |
| WO | WO1996006402 A1 | 2/1996 |
| WO | WO1999003052 A1 | 1/1999 |

OTHER PUBLICATIONS

Aditto, S. 2011. "Risk Analysis of Smallhoder Farmers in Central and North-East Thailand" Unpublished Doctor of Philosophy in Agricultural Economics Thesis Lincoln University, 1-268.

(Continued)

*Primary Examiner* — Talia F Crawley
(74) *Attorney, Agent, or Firm* — Ingenium Patents LLC; Peter R. Kramer

(57) ABSTRACT

This is an invention implying a risk management method based on synthetic data. Synthetic data are random variables that take their mean and standard deviation from experimental data. It reproduces the experimental data underlying statistic information with a statistical confidence of 99%. Experimental data could represent financial variables i.e., prices and quantities. This method implements alternative recursive bias approach that achieve convergence with related estimations already published. Also, this method is decomposable allowing synthetic data and econometric models parameter values and different risk scenarios alternatives in order to measure the system responses under different controls.

3 Claims, 21 Drawing Sheets

(56) References Cited

U.S. PATENT DOCUMENTS

| | | |
|---|---|---|
| 2005/0033679 A1 | 2/2005 | Rachev |
| 2007/0043656 A1 | 2/2007 | Lancaster |
| 2009/0144101 A1 | 6/2009 | Malov |
| 2010/0138267 A1* | 6/2010 | Vittal ................ G05B 23/0283 702/184 |
| 2011/0246385 A1 | 10/2011 | Laxmanan |
| 2012/0265709 A1 | 10/2012 | Barsade |
| 2012/0310817 A1 | 12/2012 | Trease |
| 2013/0110743 A1 | 5/2013 | Barsade |
| 2013/0185039 A1 | 7/2013 | Tesauro |
| 2013/0212410 A1* | 8/2013 | Li ........................... G06F 1/263 713/300 |
| 2013/0304669 A1 | 11/2013 | Kim |
| 2014/0007244 A1 | 1/2014 | Martin |
| 2014/0046872 A1 | 2/2014 | Arnott |
| 2014/0172329 A1* | 6/2014 | Zhang ................... G06Q 50/06 702/60 |
| 2014/0180965 A1 | 6/2014 | Pein |
| 2014/0229356 A1 | 8/2014 | Kraus |
| 2014/0249988 A1 | 9/2014 | Freund |
| 2015/0160373 A1* | 6/2015 | Feldman-Fitzthum ..................... G01W 1/10 702/3 |
| 2017/0328348 A1* | 11/2017 | Wilson .................... F03D 17/00 |

OTHER PUBLICATIONS

Ahmed, S. A. 2013 "Comparative Study of Four Methods for Estimating Weibull Parameters" International Journal of Physical Sciences 8, 5, 186-192.

Bassi, A., R. Colacito and P. Fulghiery. 2013. "'O Sole Mio: An Experimental Analysis of Weather and Risk Attitudes in Financial Decisions" The Society for Financial Studies 1-29.

Bevington, P.R. and D.K. Robinson. 1992. Data Reduction and Error Analysis for The Physical Sciences New York: McGraw-Hill.

DuMouchel, W.H. and F.L. O'Brien. 1989. "Integrating a Robust Option into a Multiple Regression Computing Environment Computer Science and Statistics: Proceedings of the 21st Symposium on the Interface Alexandria" American Statistical Association.

Guan, Z. and F. Wu. 2009. "Specification and Estimation of Heterogeneous Risk Preference" Contributed Paper prepared for Presentation at the 27th International Conference of Agricultural Economist (IAAE 2009), Beijing, China, 16-22.

Hirshleifer, D. and T. Shumway. 2003. "Good Day Sunshine: Stock Returns and the Weather" Journal of Finance 58:1009-32.

Just, R.E. and R.D. Pope. 1978. "Stochastic Specification of Production Functions and Economic Implications" Journal of Econometrics 7, 67-86.

Just, R.E. and D.R. Just. 2011. "Global Identification of Risk Preferences with Revealed Preference Data" Journal of Econometrics 162, 6-17.

Knowles, M. and D. Siegmund. 1989. "On Hotelling's Approach for Testing for a Nonlinear Parameter in Regression" International Statistical Review 57, 3, 205-220.

Langemeir, L.N. 1990. "Farm Management Data Bank Documentation" Department of Agricultural Economics Kansas State University.

Lence, S.H. 2009. "Joint Estimation of Risk Preferences and Technology: Flexible Utility of Futility" Research Paper Department of Economics Iowa State University, Ames, 1-5.

Melhim, A. and C.R. Shumway. 2010. "Enterprise Diversification in US Dairy: Impact of Risk Preferences on Scale and Scope Economies" Applied Economics 43-26, 3849-3862.

Patel, J.K., C.H. Kapadia and D.B. Owen. 1976. Handbook of Statistical Distributions New York: Marcel Dekker.

Prajneshu. 2008. "Fitting of Cobb-Douglas Production Functions: Revisited" Agricultural Economics Research Review 21, 289-292.

Saha, A. and H. Petersen. 2012. "Detecting Price Artificiality and Manipulation in Futures Markets: An Application to Amaranth" Journal of Derivatives and Hedge Funds 18, 254-271.

Saha, A., Malkiel, B. and A. Grecu. 2009. "The Clustering of Extreme Movements: Stock Prices and the Weather" The Journal of Investment Management 20-35.

Saha, A. and L. Hilton. 1997. "Expo-Power: A Flexible Hazard Function for Duration Data Models" Economics Letters, 54, 227-233.

Saha, A., Havenner, A. and H. Talpaz. 1997. "Stochastic Production Function Estimation: Small Sample Properties of ML versus FGLS" Applied Economics, 29, 459-469.

Saha, A., Shumway, C.R. and A. Havenner. 1997. "The Economics and Econometrics of Damage Control" American Journal of Agricultural Economics, 79, 773-785.

Saha, A., Klotz, C. and L.J. Butler. 1995. "The Role of Information in Technology Adoption: The Case for rbST in the California Dairy Industry" Review of Agricultural Economics 17, 287-298.

Saha, A., A. Love and R. Schwartz, Jr. 1994. "Adoption of Emerging Technologies Under Uncertainty" American Journal of Agricultural Economics 76, 836-846.

Saha, A. and J. Stroud. 1994. "A Household Model of On-farm Storage Under Price Risk" American Journal of Agricultural Economics, 76, 522-534.

Saha, A., R. Shumway and H. Talpaz. 1994. "Joint Estimation of Risk Preference and Production Technology Using the Expo-Power Utility Function" American Journal of Agricultural Economics 76, 173-184.

Saha, A. 1994. "Compensated Optimal Response Under Uncertainty in Agricultural Household Models" Agricultural Economics 11, 111-123.

Saha, A. 1993. "Expo-Power Utility: A Flexible Form for Absolute and Relative Risk Aversion" American Journal of Agricultural Economics 75, 905-913.

Seber, G.A.F. and C.J. Wild. 2003. Nonlinear Regression New Jersey: Wiley-Interscience.

Smith, W.T. and Q. Zhang. 2006. "Asset Pricing with Multiplicative Habit and Power-Expo Preferences" CIRJE-F-429. Toledo, R. and A. Engler. 2008. "Risk Preferences Estimation for Small Raspberry Producers in the Bio-Bio Region, Chile" Chilean Journal of Agricultural Research 68, 2, 175-182.

* cited by examiner

Source: Own calculations and mathworks.com

FIG. 5

Table 4. ML estimates of Weibull Parameters

| Parameter | Explanation | Synthetic data (standard error) | Published (standard error) |
|---|---|---|---|
| $b$ | scale parameter | 1.2894 (0.0521) | 1.2894 (0.0462) |
| $c$ | shape parameter | 3.4752 (0.3627) | 3.8281 (0.3486) |
| $\delta\Gamma\left(\frac{1+\hat{c}}{\hat{c}}\right)$ | estimated mean of Weibull $\epsilon$ | 1.2036 | 1.1658 |
| $\bar{\epsilon} = \frac{1}{T}\sum_{t=1}^{T}\epsilon_t$ | sample mean of $\epsilon$ | 1.1322 | 1.1711 |
| $\delta\left\{\Gamma\left(\frac{2+\hat{c}}{\hat{c}}\right) - \left(\Gamma\left(\frac{1+\hat{c}}{\hat{c}}\right)\right)^2\right\}^{\frac{1}{2}}$ | estimated standard deviation of Weibull $\epsilon$ | 0.2875 | 0.3403 |
| $\left\{\frac{1}{T-1}\sum_{t=1}^{T}(\epsilon_t - \bar{\epsilon})^2\right\}^{\frac{1}{2}}$ | sample standard deviation of Weibull $\epsilon$ | 0.7686 | 0.3125 |

Source: Saha et al. (1994) and own computations.

FIG. 6

$$Q1 = A\prod_{i}^{n} x_i^{a_i} + \exp\{\sum_{i=1}^{n} m_i x_i + \varepsilon\}$$

FIG. 7

Table 3. Summary statistics

Table 3. Summary statistics

| | Variable mean (and standard deviation) | | | | | |
|---|---|---|---|---|---|---|
| | All farmers | | Small farmers | | Large farmers | |
| | Synthetic data | Published | Synthetic data | Published | Synthetic data | Published |
| Capital inputs: $x_1$ | 50.967 | 44.051 | 33.716 | 32.017 | 56.425 | 52.073 |
| | (24.0887) | (23.0280) | (7.6147) | (9.8392) | (29.4501) | (25.7840) |
| Material inputs: $x_2$ | 69.651 | 70.059 | 34.975 | 43.206 | 84.117 | 87.961 |
| | (30.9575) | (28.0280) | (19.8822) | (17.7360) | (23.9502) | (25.7840) |
| Capital inputs price:* $p_1$ | 0.954 | 0.961 | 0.986 | 0.966 | 0.961 | 0.957 |
| | (0.0789) | (0.0663) | (0.0816) | (0.0671) | (0.0781) | (0.0664) |
| Material inputs price:* $p_2$ | 0.996 | 0.993 | 0.980 | 0.991 | 0.993 | 0.994 |
| | (0.0500) | (0.0455) | (0.0634) | (0.0487) | (0.0480) | (0.0438) |
| Exogenous income:* $I$ | 55.208 | 51.652 | 36.762 | 41.407 | 34.473 | 58.482 |
| | (21.5051) | (18.8790) | (8.9254) | (8.5820) | (18.3448) | (20.7950) |
| Wheat output: $Q$ | 127.547 | 132.060 | 80.731 | 78.071 | 126.849 | 168.050 |
| | (42.9020) | (56.3550) | (14.4280) | (25.5820) | (39.0083) | (39.9030) |

* Prices and income are normalized by output price. Source: Saha et al. (1994) and own computations.

FIG. 13 alphah=0.3654, se=0.3654E-11
betah=2.7370, se=2.737E-11

FIG. 14 mmiu1h=0.3206
mmiu5h =0.5207

FIG. 16

Amh= 3.0896, se= 0.1974E-17 am1h= 0.2012, se= 0.2174E-17 am2h= 0.6522, se= 0.0165E-17 m1bh=1.71E-16, se=0.0001 m2bh=3.17E-17, se=0.0001 mmmiu1h=0.4276 mmmiu5h=0.6535

FIG. 18

A5h= 2.114, se= 0.0367E-13
a15h= 0.2554, se= 0.0473E-13
a25h= 0.7564, se= 0.5284E-13
m15h=0.0526, se=0.2248E-16
m25h=-0.0709, se=0.2744E-16
mmiu15h=0.3722
mmiu25h=0.5689

FIG. 19

Table 5. Parameter estimates of EP utility and CDE production function

Table 5. Parameter estimates of EP utility and CDE production function

| EP utility parameter | Explanation | Joint est.[a] Synthetic | Joint est.[a] Published | Under CARA[b] Synthetic | Under CARA[b] Published | Only CDE[c] Synthetic | Only CDE[c] Published |
|---|---|---|---|---|---|---|---|
| $\alpha$ | $\alpha < 1 \Rightarrow DARA$ | 0.3654 | 0.3654 | | | | |
| $\beta$ | $\beta > 0 \Rightarrow IRRA$ | 2.7370 | 2.7370 | | | | |
| CDE production function parameters[d] | | | | | | | |
| A | Parameters of the non-stochastic part of CDE | 1.6051 | 1.6051 | 2.114 | 2.114 | 3.0896 | 3.3644 |
|  |  | (1.51E-14) | (0.1530) | (0.03E-13) | (0.3534) | (0.19E-17) | (1.2606) |
| $a_1$ |  | 0.2554 | 0.2554 | 0.2554 | 0.2561 | 0.2012 | 0.2224 |
|  |  | (1.45E-15) | (0.0126) | (0.04E-13) | (0.0134) | (0.21E-17) | (0.0665) |
| $a_2$ |  | 0.7564 | 0.7564 | 0.7564 | 0.7169 | 0.6522 | 0.6715 |
|  |  | (1.79E-15) | (0.0179) | (0.52E-13) | (0.0286) | (0.01E-17) | (0.0957) |
| $m_1$ | $m_j < 0 \Rightarrow$ jth input is "risk reducing" | 0.0612 | 0.0612 | 0.0526 | 0.0526 | 1.71E-16 | 0.0252 |
|  |  | (0.04E-14) | (0.0050) | (0.22E-16) | (0.0077) | (0.0001) | (0.0062) |
| $m_2$ |  | -0.0337 | -0.0337 | -0.0709 | -0.0709 | 3.17E-17 | 0.0406 |
|  |  | (0.17E-14) | (0.0054) | (0.04E-13) | (0.0070) | (0.0001) | (0.0042) |
| SSE | Sum of squared errors[f] | 2.37 | 2.49 | 4.35E-24 | 4.81 | 2.05E-28 | 15.9700 |
| Partial production elasticities[e] | | | | | | | |
| $\mu_1$ | Elasticity of $x_1$ | 0.3206 | 0.2031 | 0.3722 | 0.2265 | 0.4276 | 0.2381 |
| $\mu_2$ | Elasticity of $x_2$ | 0.5267 | 0.6016 | 0.5689 | 0.6354 | 0.6535 | 0.7047 |

[a] Expected utility maximization model (unrestricted); [b] Expected utility maximization under the restriction $\alpha = 1$, implying CARA; [c] CDE production function published parameter estimates: modified Just-Pope method; [d] Subscripts 1 refers to capital and 2 to materials; [e] Computed at the sample mean; [f] In simulation, MSE generated from the fists stage regression. Source: Saha et al. (1994) and own computations.

FIG. 21

Table 6. Arrow-Pratt Risk Aversion Measures

Table 6. Arrow-Pratt Risk Aversion Measures

| | Estimates (standard errors)[a] | | | | | |
|---|---|---|---|---|---|---|
| | All farmers[f] Synthetic | All farmers Published | Small farmers[f] Synthetic | Small farmers Published | Large farmers[f] Synthetic | Large farmers Published |
| Estimate of EP parameter $\alpha$ | 0.365 | 0.365 | 0.405 | 0.292 | 0.229 | 0.266 |
| | (1.00E-11) | (0.029) | (0.58E-09) | (0.031) | (0.004) | (0.028) |
| Estimated mean wealth:[a] $\widehat{W}$ | 49.449 | 46.213 | 11.985 | 35.768 | 57.857 | 53.177 |
| | (45.287) | (18.483) | (10.549) | (8.422) | (31.706) | (20.114) |
| Absolute risk aversion:[b] $A(\widehat{W})$ | 0.0002 | 0.0075 | 0.0011 | 0.0083 | 0.0008 | 0.0045 |
| | (0.0001) | (0.002) | (0.0011) | (0.002) | (0.003) | (0.023) |
| Relative risk aversion:[c] $R(\widehat{W})$ | 8.522 | 5.400 | 1.137 | 3.759 | 8.028 | 4.075 |
| | (3.737) | (0.540) | (0.626) | (0.322) | (0.381) | (0.391) |
| Test statistics for the null hypothesis of risk neutrality[d] | -7.376 | -4.693 | -9.720 | 3.595 | -3.503 | -3.724 |
| | (1.769) | (0.406) | (3.719) | (-0.264) | (0.807) | (0.316) |

[a] Estimated mean wealth: $\widehat{W} \equiv \int_0^3 \{\hat{A}(\bar{x}_1)^{\bar{s}_1}(\bar{x}_2)^{\bar{s}_2} + exp(\bar{m}_1\bar{x}_1 + \bar{m}_2\bar{x}_2 + \epsilon) - r_1\bar{x}_1 + r_2\bar{x}_2 + l\}PDF(\epsilon)d\epsilon$; [b] $A(\widehat{W})$ for EP utility: $\frac{(1-\hat{\alpha}+(\widehat{W})^{\hat{\alpha}})}{\widehat{W}}$; [c] $R(\widehat{W})$: $\{1 - \hat{\alpha} + (\widehat{W})^{\hat{\alpha}}\}$; [d] $H_0: \psi = 0$, where $\hat{\psi} \equiv \hat{\alpha} - 1 - \hat{\alpha}\hat{\beta}\widehat{W}^{\hat{\alpha}}$; [a] The standard errors of $A(\widehat{W}), R(\widehat{W})$ and $\hat{\psi}$ have been calculated using the delta method; [f] Adjusted by a percentage factor. Source: Saha et al. (1994) and own computations.

HOW TO MODEL RISK ON YOUR FARM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

Field of the Invention

The inventive subject matter of this disclosure relates to methods for risk management. Exemplary embodiment of this invention is a method for risk management based on synthetic data, as well as computer-readable media tangible embodying program instructions and computer-generated program output.

In the field of risk management there are problems associated with its three milestones: sample design; operations research and decision theory. These problems are described next.

Sample design problems. The user of databases realizes that data access depends on sampling design; surveys took in experimental fields; data collection and its capture. Thus, database construction is a complex process that takes a long time. Also, it implies high economic costs, because sample randomness and representativeness needs to be assured in the sampling process, in order to set up different time data sets compilations and comparisons. Also, database construction is not efficient because it depends on seasonal periods that have different time spans: seconds; minutes; days; months; years, which imply a high time frequency heterogeneity. Besides, database construction depends not only on uncontrollable randomness problems, but also from sample individuals that change their location causing missing data entries. At least two problems demonstrate how easy sample database could lose population representativeness. In general, these problems could be fixed with a careful sample design plan but with a high money costs. Another database construction problem is related with small sample size and the number of observations collected across time are too few. For example, consider sampling threes to measurement their humidity and carbon composition including their roots. This sampling would imply extracting the entire three and chopped it in order to burn it and take the respective measurements. This example demonstrates how complicate and expensive could be sampling only one individual. This sampling operation could be done up to three times in an experimental field in a time span of several years. These problems along with other sampling design problems no discussed here are known by the name of sparse data problems.

Operations research problems. For other part, the field of risk management has to deal with sparse data problems to perform risk analysis. This problem has been addressed by the operations research field by means of asymptotic theory that relies in Monte Carlo and Bootstrap simulations. These simulations could increase artificially the number of repetition and thus increase the sample size either on time frequencies and number of individuals. The idea is to increase the sample size as to approximate asymptotically the population estimator and thus having consistent estimators. These consistent estimators are the estimators compute from a large sample size. A disadvantage of these simulations is a requirement for a lot of computation and processor power. given their intrinsic repetition loops. As the sample size becomes larger, these simulations program running could last weeks to complete. Therefore, these simulations could monopolize computing time of expensive super computers and requires complicated parallel processors arrangements. However, numerous studies have shown that the consistency of asymptotic estimators is not achieved when time frequency is increased and not the number of individuals. In the same manner this consistency is not achieved when the number of individuals are increased and not the time frequency. Also a combination of these two last possibilities could happen. Thus, basically the asymptotic estimators inconsistencies are caused by a bias problem, which is introduced in Monte Carlo and Bootstrap simulations meanly through interactions between individual-effects and time frequencies. In addition, there are other problems associated with these simulations. For instance, Monte Carlo simulations plus a finite differencing approach can become very inefficient in calculating two-sided deltas for payoffs based on a portfolio of 100 assets. Moreover, a total of 201 simulations using common random numbers must be run: 1 base simulation, 100 simulations in which the starting value for each asset is individually reduced to say 99% of its base value, and 100 simulations in which the starting value for each asset is individually increased to say 101% of its base value.

Decision theory problems. This field also suffers from sparse data problems. This means that lack of data makes difficult assessing and identifying the principal sources of system uncertainty. This is due because lack of data hinders system response record under parameters fluctuations. When an adequate system response record is available, i.e., full risk sensitivities estimates set can be computed. There is a branch of economic theory that identifies structures and degrees of risk preferences based on risk sensitivities estimates. In other words, sparse data problems make difficult the construction and assessment of risk scenarios to fully inform the decision maker. This difficulty is an important liability, because the decision maker lacks of information impacts negatively his risk management plan decisions, especially in those cases when his decisions are not reversible. Lack of full information, in this case is related with lack of adequate database to compute full risk sensitivities estimates set with a high degree of statistical confidence. That is to say, that could reproduce the system response as it the parameter fluctuation had happened in reality.

In summary, in the field of risk management there is a lack of a methodology that could integrate each of the three risk management problems mentioned above, in an inexpensive way and in a short period of time, i.e., less than 20 seconds. Such a method should provide the means to solve sparse data problems by modifying data sample size and construct easy access data sets. Then these data sets could be used to fix sparse data problems in the fields of research operations and decision theory. This method should also provide the means to validate that its measurements are statistically reliable as well as to inform correctly about the intrinsic system uncertainties, i.e., risk sensitivities estimates. Another desirable feature of this method is the computation of consistent estimator, which in turn could be more efficient than Monte Carlo and Bootstrap estimators. It could be desirable that this method could avoid asymptotic bias caused by enlarging artificially the sample size. Another feature of this method is that it does not impose in the sample an asymptotic estimator, without closing the gap between sample and asymptotic sizes. The existence of such a method could provide the policy maker with full information to implement risk management plans based on complete risk scenarios assessment under a control variable design. Here, the control variable design is related with modifications on synthetic data and econometric parameters to test and control risk sensitivities estimates changes and keep a system responses record.

BRIEF SUMMARY OF THE INVENTION

This invention is based on a risk management method based on synthetic data. Synthetic data replicate experimental data with a statistical confidence of 99%. Thus, synthetic data could solve sparse data problems, because they can fill missing entries and can escalate the sample size up or down according with a factor of economic activity. This method implements econometric models that achieve The method's features are flexible since they permit the construction of complete risk scenarios assessment under a control variable design to inform the policy maker about the possible consequences of his decisions. The control variable design considers changes on parameter values; factors of economic activity and risk scenarios settings. The method structure is flexible because it could integrate the three risk management milestones. Alternatively, this method could be decomposed on each of the risk management milestones, i.e., sampling design, operations research and decision theory.

FIG. 5 is Table 4: ML Estimates of Weibull Parameters;

FIG. 6 is equation 11 in Saha;

FIG. 7 is Table 3. Summary Statistics;

FIG. 9 is the output of the first stage on Saha estimation CDE nonrandom part method. A stands for technology; a1 stands for the elasticity coefficient of capital; a2 stands for the elasticity coefficient of materials and h stands for hat;

FIG. 11 is the output of the second stage on Saha CDE random part estimation method: m1 stands for the elasticity coefficient for input not risk reducing; m2 stands for the elasticity coefficient for input risk reducing and h stands for hat in accordance with the present invention;

FIG. 13 is the output of the wealth function estimates: alpha is the expo-power utility parameter; beta is the expo-power utility parameter and h stands for hat;

FIG. 14 is the output of the joint estimation partial production elasticities estimates: mmiu1 stands for the partial production elasticity of x1; mmiu5$h$ stands for the partial production elasticity of x2 and h stands for hat;

Figure 17:
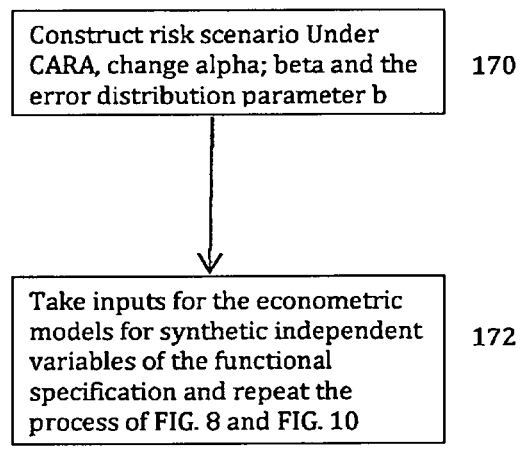
Figure 20:
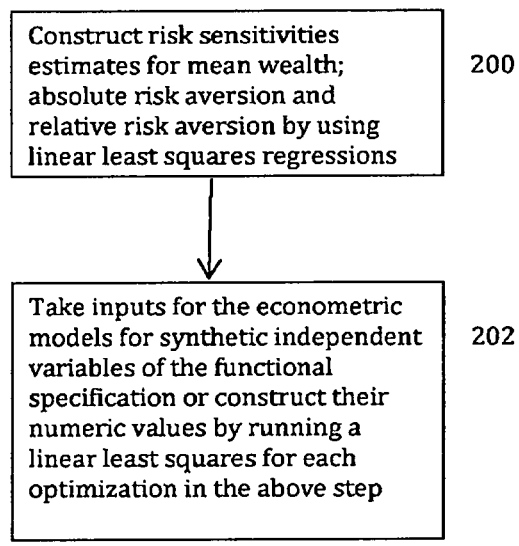

FIG. 16 is the output of the risk scenario Only CDE: Amh stands for technology; am1$h$ stands for the elasticity coefficient of capital; am2$h$ stands for the elasticity coefficient of materials; m1$bh$ stands for the elasticity coefficient for input not risk reducing; m2$bh$ stands for the elasticity coefficient for input risk reducing; mmiu1$h$ stands for the partial production elasticity of x1; mmiu5$h$ stands for the partial production elasticity of x2; where m and b letters in the variable names stands for only CDE and h for hat, respectively;

FIG. 17 is an illustration of a flow chart to compute the second risk scenario Under CARA in accordance with the present invention;

FIG. 18 is the output of the risk scenario Under CARA estimates: A5$h$ stands for technology; a15$h$ stands for the elasticity coefficient of capital; a25$h$ stands for the elasticity coefficient of materials; m15$h$ stands for the elasticity coefficient for input not risk reducing; m25$h$ stands for the elasticity coefficient for input risk reducing; mmiu15$h$ stands for the partial production elasticity of x1; mmiu25$h$ stands for the partial production elasticity of x2;

FIG. 19 Table 5. Parameter estimates of EP Utility and CDE Production Function;

FIG. 20 is an illustration of a flow chart of a method for an embodiment to compute Table 6 risk sensitivities estimates in accordance with the present invention;

FIG. 21 is Table 6. Arrow-Pratt Risk Aversion Measures.

DETAILED DESCRIPTION OF THE INVENTION

This invention is relevant because it makes possible to perform risk management analysis from a computer desk. This is because this method does not need to:

1. perform the experiment "n" number of times to obtain a representative sample; 2. implement data processing (collection; entering and analysis); 3. presence at the time and location of the field experiment; 4. knowledge of the system sample design and knowledge of the estimation methodology; 5. An error term a priori variable to detect system uncertainty and its associated risk.

This invention fills a gap in risk management literature, because it integrates in one flexible system the three management milestones: sample design, operation research and decision-theory. This is because it allows control variable design by means of modifications on synthetic variables initial values and econometric models parameters values under specific behavioral assumptions. Thus, this flexibility allows its application to "n" risk management problems.

This invention fills a gap in risk management literature sample design, because the use of synthetic data on a risk management system is new. Synthetic data can solve sparse data problems by filling missing data and modifying the sample size. This is it, because synthetic data can be modified their sample size, increasing or decreasing the observations number, by adjusting a factor of economic activity with a 99% of statistical confidence. Where the factor of economic activity represents different types of economic aggregations. In the invention application the factor of economic activities is related with small, large and all farmers.

This invention fills four gaps in operations research literature. First gap. Computation difficulties due to sparse data problems are overcome with the use of synthetic data. Second gap: Monte Carlo and Bootstrap simulations design estimator bias problem, meaning the researcher bias in the selection of the population estimator value, which by definition is a consistent estimator. In contrast, synthetic data and the operations research method implemented here and called "alternative recursive bias approach" provide the means to avoid the design estimator bias problem. Also, this alternative recursive bias approach does not need to increase the sample size for computing consistent estimators. Third gap: it fills the computational gap that remains between asymptotic estimators and sample estimators values. This implies that the researcher does not have to impose an asymptotic consistent estimator value on a sample which by definition is not asymptotic. Four gap: this invention solves database time and money constraints and allows a fully control theory application on risk scenarios. These gaps are filled because this method is flexible. This implies that it is decomposable in the three risk management milestones problems that this invention addresses. Also, this invention is flexible because allows modification of synthetic data and econometric model parameter values to assess different risk scenarios alternatives under a controlled variable design.

This invention fills a gap in decision theory literature, because the use of synthetic data allows replicate experimental data and their risk scenarios in a few seconds, i.e., 20 seconds. This feature could assess different system responses, under controlled interventions or policies and different risk scenarios alternatives. Importantly, these assessments could be computed before a real control variable parameter value change. So, the policy maker could have information to foresee the implications of different policies before they happened with a confidence of a 99% and implement accordingly a feasible risk management plan.

In what follows this invention is applied to the following paper: Saha, A., R. Shumway and H. Talpaz. 1994. "Joint Estimation of Risk Preference and Production Technology Using the Expo-Power Utility Function" *American Journal of Agricultural Economics* 76, 173-184. This application demonstrates that synthetic data can mimic experimental published estimates. For the inventor "mimic" meaning is closely related with the more common term "clone." This could imply that synthetic data are clones from experimental data, and thus why their estimations are almost identical. Here, synthetic data are random variables that take their mean and standard deviation from experimental data. These two statistics have the intrinsic probabilistic distribution properties of the relevant experimental data variables. Synthetic data reproduce the experimental data underlying statistic information with a statistical confidence of 99%. Thus, this invention by means of its synthetic data and its alternative recursive bias approach could replicate related published results. In this way this method allows calibration.

Also, this invention demonstrates that synthetic data estimators are more efficient than experimental data estimators, since they are computed from an alternative recursive bias approach. This approach is embodied on the econometric model optimizations based on the alternative recursive bias approach, which are the inventor own design. This mean that this method econometric approach models the functional relationships. For example, in the invention application this means that without applying the paper authors experimental data methodology, i.e., a modified Just and Pope method and numerical integration, the same statistical results can be achieved independently based only in the relevant variables functional specifications.

The alternative recursive bias approach permits synthetic data to achieve consistent estimators and a diminishing scaling variance. This consistency is reflected in its estimator small standard errors and its estimator convergence with related published values. This approach relies on the Marquardt-Levenberg gradient expansion algorithm and in the Levenberg-Marquardt algorithm for non-linear least squares; synthetic data generated from experimental data descriptive statistics and behavioral assumptions. These three features together enable convergence with a consistent estimator without enlarging the sample size. This convergence is reached because synthetic data construction samples from an infinite population allows gains in efficiency by reaching the estimator Rao-Cramer lower bound.

Importantly the alternative recursive bias optimization approach does not need to increase the sample size, in order to obtain an efficient estimator. In contrast Monte Carlo and Bootstrap simulations imply large sample sizes to find sample estimator asymptotic convergence with a population estimator, which by definition is a consistent estimator. In these simulations, the population estimator value is provided before the simulations experiments begin. This simulations design introduce a researcher bias consisted in a priori selection of the population estimator value. The alternative recursive bias optimization approach provides the means by which a consistent estimator value does not have to be predetermined and delivers similar estimator results as Monte Carlo and Bootstrap simulations. This approach, to the knowledge of the author has not been previously implemented. Thus it fills a current gap in the operations research area literature.

The efficiency of this invention application is validated, when its estimates replicate the statistical inference achieve by experimental data results. Therefore, this method allows synthetic data to express the same producer preference degree and preference structure of risk aversion as well as experimental data do. Thus, the substitution of experimental data by synthetic data is feasible for risk management analysis. Given the low computational and financial cost that this method conveys, it provides risk management analysis easy access to a wide number of persons or entities regardless their income level: researchers; farm associations; state governments; consulting firms; Wall Street financial markets; commercial banks; insurance companies; Federal Reserve policy implications assessments; national governments interventions assessments; classroom teaching; to mention just a few of them.

The best mode to implement this method is using Matlab language. However, the implementation in other languages can be done using equivalent instructions in different programing languages such as Fortran, C, R, etcetera.

During the rest of this invention application description Saha et al., (1994) paper would be mentioned as Saha or authors indistinctly. This description provides instructions for executing the application.

1. Construct synthetic data. Take the published experimental data descriptive statistics: mean and standard deviation. To simplify things, you can use Matlab integrated modules that provide already random number generators.

Figure 1:
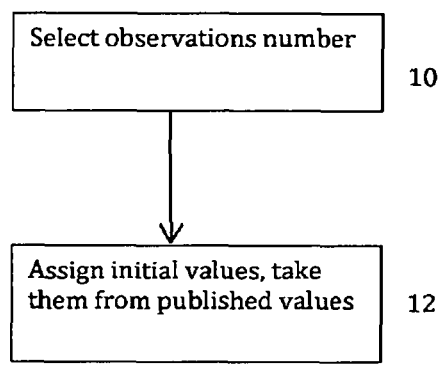
FIG. 1 is an illustration of a flow chart of a method for an embodiment to assign initial number of observations and values for synthetic data in accordance with the present invention.

1.a. Assign initial values for synthetic data. Please note that in this invention application, the variable names, values, and functions match those in Saha. Take into consideration the number of observations, i.e., all farms are 15 and the number of years are four, so it gives back 60 observations, 15 times four (Step 10). To assign the initial values pick the ones already published in Table 5 in Saha (Step 12). See FIG. 1.

1.b. Once you completed the above step, proceed to construct synthetic data. Behavioral assumptions implementation: be careful of not hitting negative values. Remember than in economics negative prices and quantities do not have meaning. These set of behavioral assumptions applied to synthetic data construction are critical to achieve the results display in tables 3, 4, 5 and 6.

Figure 2:
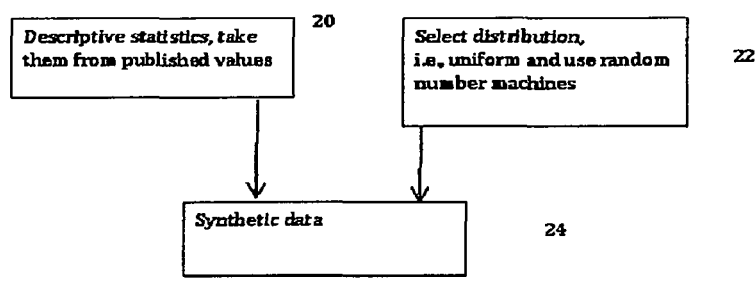
FIG. 2 is an illustration of a flow chart of a method for an embodiment to generate 130 synthetic data based on descriptive statistics initial values and the uniform distribution in accordance with the present invention.

To construct synthetic data reported in Table 3, see FIG. 2, it was used the random number generator with a uniform distribution (Step 22), taking into account the published experimental data mean and standard deviation in Saha (Step 20). Although, it seems that the correct way to proceed is by using a random Weibull distribution instead of the uniform distribution. This characteristic seems to come from the fact that given the mean and standard deviation from experimental data, a symmetrical distribution around the mean reaches negative numbers. Therefore, the standard deviations have to be adjusted accordingly. That is to say, instead of allowing the data dispersion to be in the range within two standard deviations from the mean and reach negative values, take different factors among one and two standard deviations from the mean then preventing generation of negative values. In consequence, synthetic data defined only in the real number real are generated using a random number generator to provide the econometric models synthetic independent variables (Step 24).

Figure 3:
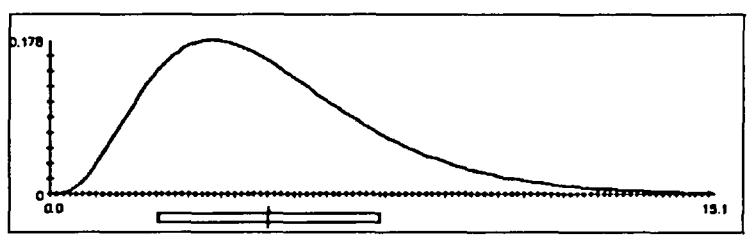
FIG. 3 is an illustration of a Weibull distribution function graph for the error term with shape 3.8 and scale 1.3. The center of the boxplot displays the median.

2. Error term construction. Follow Saha functional form to construct the Weibull error term, with b scale parameter and c shape. Take the error term initial values from Table 4 Saha and call it $\varepsilon\_$. The graph of this error term distribution is presented in FIG. 3 which shows the Weibull distribution for the error term only takes positive values and it is skewed to the left. This made economic sense as described above.

Figure 4:
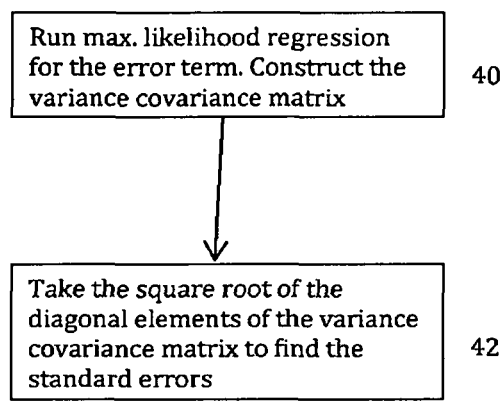
FIG. 4 is an illustration of a flow chart of a method for an embodiment to compute standard errors in accordance with the present invention.

The standard errors were calculated based on a Marquardt-Levenberg gradient expansion algorithm (Step 42), where the diagonal terms of the curvature matrix are increased by a factor that is optimized in each search step for optimum values (see Bevington and D. K. Robinson (1992), also see Patel, J. K., C. H. Kapadia, and D. B. Owen (1976)). The asymptotic variance-covariance matrix of the parameter estimates from the maximum likelihood regression is the matrix computed as the inverse of the Fisher's information matrix (Step 40). The corresponding system and method are reported in FIG. 4.

The tables in Saha are referred by their numbers, herein reproduced along with the report of synthetic data and their estimates next to the related experimental data results. This presentation purpose is to facilitate comparisons. The standard errors for the maximization of the log-likelihood Weibull are reported in Table 4, in here reproduced along with the corresponding experimental data estimates b and c. The authors used a modified Just-Pope method to compute the last estimates initial values. Besides, the estimated mean and standard deviation of Weibull error (e) are reported. The sample standard for epsilon (es) (error from the sample) was simulated, along with its mean and standard deviation. See FIG. 5.

The variance of the estimated epsilon (e_) is 1.1322 and for (es) is 0.3284, i.e., every time you hit the run button it changes, because a new random number is generated. However, the variance coming from these trials keeps a close resemblance to the one herein mention. Also, the dependent variable Q1 is generated with the functional relationship expressed in Saha equation number 11, see FIG. 6.

In what follows, it is presented the summary statistics reported in Table 3, along with those generated from this application, see FIG. 7.

3. According to Saha the complexity of the estimation of equation (14) can be substantially reduced if prior parameters b and c estimates of the Weibull probability density function (p.d.f) in equation (15) are used in the estimation of equation (14).

3.1. Estimate b and c for equation (15) and call them bh and ch with bh=1.2976 and ch=3.7357. See the above estimation description in the first part for a refresher on how these parameters are estimated.

For the parameter initial values, according with Saha, they can be provided through prior estimation using a Just-Pope method with some modifications to address the fact that $\varepsilon$, the stochastic yield variable has a Weibull distribution. Importantly, synthetic data for this application take their initial values from published descriptive statistics. Besides, Saha mentions that the initial values for the production function parameters proceed in two stages.

Thus, this application implements the first stage following Saha functional specification estimation method description: "In the first stage, the production function is estimated through nonlinear least squares on (16) . . . ." Having this purpose in mind, use the Levenberg-Marquardt algorithm for non-linear least squares (see Seber, G. A. F., and C. J. Wild (2003)) (Step 80). This algorithm does not compute robust fits. For robust fits, you need to use an algorithm (see DuMouchel, W. H., and F. L. O'Brien (1989)) that iteratively refits a weighted nonlinear regression, where the weights at each iteration are based on each observation's residual from the previous iteration. For the application estimation of the nonrandom part, equation (16) through non-linear least squares, take inputs for the econometric models for synthetic independent variables of the functional specification synthetic data capital and materials (Step 82), see FIG. 8. Thus, the corresponding output for the above defined variables is reported in FIG. 9. where the h stands for hat; se stands for standard error. These results are also reported in their corresponding tables.

Figure 10:
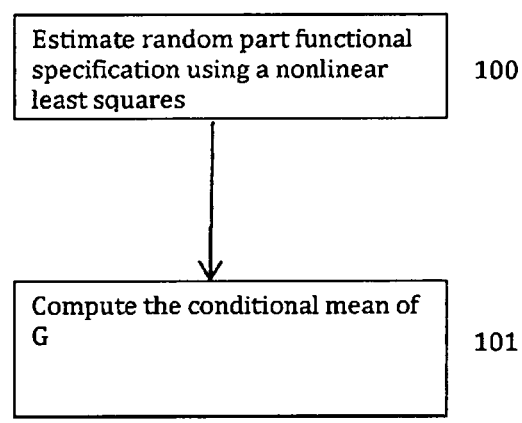
FIG. 10 is an illustration of a flow chart of a method for an embodiment for the second stage on Saha CDE random part estimation method: G stands for the log of the square error term in accordance with the present invention.

3.2 In accordance with Saha, the second stage corresponds with the estimation of the random part of equation (16), see FIG. 10. A specific structure in the random part is to be imposed in this application in a similar manner mention by Saha (Step 100). The corresponding parameters for this stage are the conditional mean of G or log of the square error term. In accordance with Just, R, and J. David (2011, p. 10) $E(\varepsilon)=0$, the expected value of the error is zero or the expected mean value for the error term is zero. Although, for this application this assumption is not quite correct.

So, the output values corresponding with the variables of interest from the above application embodiment of FIG. 10 is reported in FIG. 11.

Figure 12:
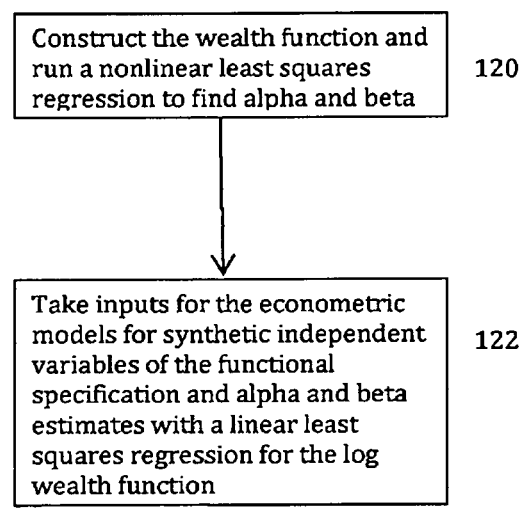
FIG. 12 is an illustration of a flow chart of a method for an embodiment for the wealth function computation in accordance with the present invention.

4. According to Saha after estimating M=ln the above respect, the inventor considers that the grid search would be faster if you optimize and found a maximum value, see FIG. 12. Thus, since the parameters and independent random variables needed for computing wealth are already estimated (where W stands for wealth), proceed through the optimization path (Step 120). Performing this evaluation on a complete grid, as required by the "max" function, will be much less efficient since it samples a small subset of grid discrete points. Optimization algorithms could be used for continuous grid search. Thus, this application embodiment uses the continuous rather than discrete grid search.

Note that the profit function does not include the output price, because Saha has normalized with respect to it. Thus it becomes the unit. Also, with this procedure the Joint estimation is integrated in W computation. Moreover, this computation integrates the CDE technology functional specification previously obtained through equation (16) in its two stages. To be more explicit about computing W, take inputs for the econometric models for synthetic independent variables of the functional specification and the parameters already determined in previous optimizations (Step 122), plus the published alpha value as an initial value.

Therefore, the above simulated output parameters of interest are presented in FIG. 13.

Figure 14:
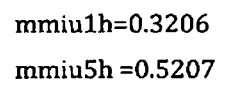

The partial production elasticities at the sample mean are reported in Table 5, see FIG. 14.

5. In here Saha's Empirical Model section finishes. This section described the estimation procedure, which is mimicked by the application and described up to this point. Next, the invention application implements further steps for constructing a joint estimation risk scenario. For constructing risk scenario, concatenate all the mimicked estimation procedures executed previously and integrate their results. Table 5 reports this concatenation for the Joint estimation risk scenario. Remember that it is not required to compute r1 (capital input prices) and r2 (material input price), because they are experimental data already reported in Table 3. In other words, r1 and r2 mean and standard deviation are reported in Table 3. Therefore, there is no need to solve Saha's equation (14) integral to obtain these input prices. Thus, the (2n+5)X1 φ experimental data parameter vector is mimicked with the application estimates results. The interpretation on the number of parameters in the φ vector is (2 for alpha and beta, n for 15 farms); 5 (for A, a1, a2, m1 and m2). This application parameters values are reported already as output from the non-linear least squares optimization procedures implementation. In this way all the estimates needed in equation (14) are already mimicked, thanks to synthetic data and the alternative recursive bias approach implementations, which are embodiments of this invention.

Moreover, in the identity expressed in equation (6) on Saha, which could be worded as follows: optimal input levels are identical to maximize expected utility. In other words, this invention works in the left hand side of identity (6). This is because it finds optimal input levels. Therefore, this application computes vector φ by finding optimal input levels by implemented the alternative recursive bias approach optimization econometric models own design which estimate the paper functional relationships. This application procedure is endorsed by Saha equation (6) identity. Therefore, synthetic data and the alternative recursive bias approach optimization procedure applied to Saha and equation (6) identity also maximize expected utility. Thus, risk sensitivities estimation could be implemented by this application.

In this application final part the risk sensitivity estimates are simulated and compared with those reported in Saha. To implement this analysis, follow Saha: "Comparison of the three sets of estimation results underscores the sensitivity of estimates to alternative assumptions" p. 182.

Later on, the authors mention that efficiency gain can be assessed by comparing standard errors on the three sets of estimations reported in Table 5. Also, comparisons are considered for "m" coefficients and the Sum of Squares Errors (SSE).

Figure 15:
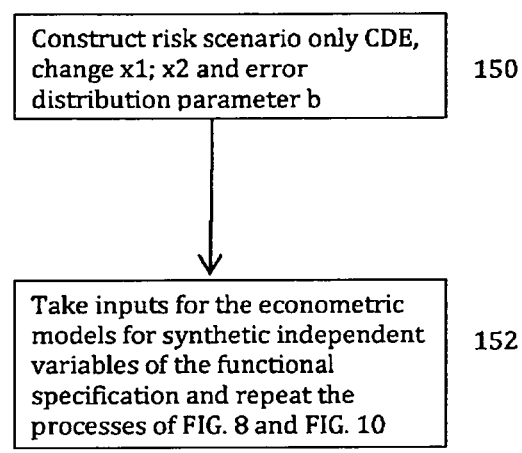
FIG. 15 is an illustration of a flow chart that modifies previous econometric models to compute Only CDE risk scenario in accordance with the present invention.

In order to compute risk sensitivity estimates computations, first it is required to proceed in a similar way as explained above to estimate three different risk scenarios. The third method of Table 5: Only CDE, see FIG. 15. Thus, construct the risk scenario only CDE, change x1; x2 and the error distribution parameter b (Step 150). Take inputs for the econometric models for synthetic independent variables of the functional specification and repeat the process of FIGS. 8 and 10 (Step 152).

Change parameters values x1, x2 and the error distribution parameter: b. The corresponding estimates are reported in FIG. 16.

For the second method estimation in Table (5), see FIG. 17. Thus construct the risk scenario under CARA. Change parameters values alpha; beta and the error distribution parameter b (Step 170).

Figure 8:
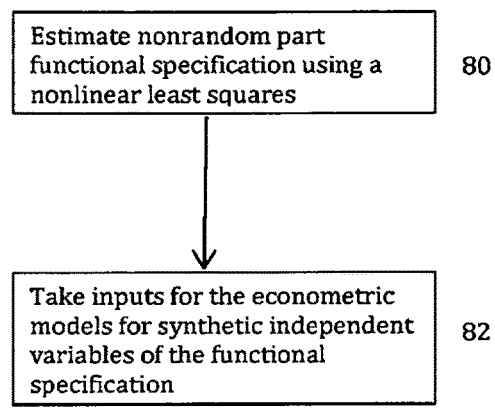
FIG. 8 is an illustration of a flow chart of a method for an embodiment for the first stage on Saha CDE nonrandom part estimation method in accordance with the present invention.

Take inputs for the econometric models for synthetic independent variables of the functional specification and rename them A=AA; risk aversion parameters: alpha, beta; risk distribution parameters: m1=n1, m2=n2; and error distribution parameter: b and repeat the process of FIG. 8 and FIG. 10 (Step 172). The corresponding estimates are reported in FIG. 18.

In Table 5 the published and synthetic estimates are provided, see FIG. 19.

As it can be seen convergence between A; a1 and a2 estimates for this application and the authors experimental data published estimates is achieved. Diminishing scale variance for this application estimators are exhibited in their standard errors which are very small, with respect to the ones reported for equivalent experimental data estimators. A similar pattern is emulated for the risk scenarios Under CARA and Only CDE. When looking only at the application risk scenarios estimators standard errors, they mimic the experimental data pattern. For example, the smallest standard errors belong to Joint est., follow by Under CARA and Only CDE risk scenarios. This pattern in Saha words is consist on: " . . . a prominent feature of these results is that the standard errors of estimates under the joint estimation procedure are consistently and considerable lower than those under alternative settings. This suggests that there is indeed a substantial efficiency gain in joint estimation, corroborating similar findings by Love and Buccola."

For m1 and m2 coefficients convergence are also achieved between synthetic and experimental estimates. The application standard errors are smaller than those from the experimental data estimation. Input 2 materials is risk reducing in Joint estimation and Under CARA risk scenarios. For column Only CDE convergence is not achieved between reported and simulated estimates, however, they keep the same positive sign with respect to its publish analog. Overall, regarding m1 and m2 this application exhibits a similar behavior pattern as with experimental data. Thus, similar statistic inference could be deducted from synthetic data as well as when experimental data is used. Thus, this application three risk scenarios could reach similar conclusions as in Saha " . . . when jointly estimated, coefficient m2 is negative and significant, suggesting that x2 is a risk reducing input: the same parameter is positive and significant when non-jointly estimated. This suggests that estimation from the utility functions—as is prevalent in a considerable body of applied research—may lead to serious errors in inference."

Regarding the SSE, taking into account its different qualifications, are smaller for Joint estimation, than for Under CARA and Only CDE. Therefore, globally, this statistic indicates that the best model is joint estimation. Although SSE for Only CDE cannot be compared with the rest of columns or methods. This happens because this method considers different variables.

Regarding application partial production elasticities, they keep similar values across methods with those derived from experimental data. The partial production elasticity for materials takes values in the interval [0.52 0.70].

5.3 Next, the application steps for computing Table 6 and Table 6 are presented. In FIG. 20 Step 200 it is constructed the risk sensitivities for the mean wealth; absolute risk aversion and relative risk aversion by using linear least squares regression. For Step 202 take inputs for the econometric models for synthetic independent variables of the functional specification or construct their numeric values by running linear least squares for each corresponding optimization, i.e., mean wealth. In FIG. 21 the corresponding output is reported as the Arrow-Pratt Risk Aversion Measures.

The first row of Table 6 belongs to alpha (a) parameter, which is already reported in Table 5 for all farmers. Convergence between the application and experimental data estimates are achieved for all farmers and large farmers, with the exception of small farms. An analog case is presented in the estimation of the mean wealth, where all and large farmers achieved convergence, while small farmers do not. The absolute risk aversion estimates maintain consistency regarding a positive sign. The coefficient convergence is achieved within the second decimal position.

The reported risk preferences behavior for small and large farmers with respect to $A(\overline{W})$ and $R(\overline{W})$ are mimicked by this application. Also, in the preceding paragraph it was noted that small farmers have a somehow different trend than the other bigger sample sizes. Perhaps this is due to the fact that the bigger dispersion between this application and published estimates is found for small farms. This fact could be linked in turn with its relative smaller size with respect to large and all farmers sample size. Thus, small farmers implicitly have a diminishing representativeness in the whole 575 sample. Thus, this application could conclude a differential behavior linked with the sample size in a similar manner as Saha: "Arrow-Pratt estimates for both groups are consistent with DARA and IRRA. The small farmers do show a higher level of $A(\overline{W})$ and a lower level of $R(\overline{W})$ than do the larger farmers."

This application risk sensitivities estimates reach similar experimental data statistic inference, when the null hypothesis of risk neutrality is tested. This is because application risk sensitivities estimates achieve convergence with experimental data related estimates for the three risk scenarios under consideration. The previous statistic inference similarities also applied for the null hypothesis values. Therefore, this application could use the same Saha statistic inference: " . . . the hypothesis of risk neutrality is clearly rejected in favor of risk averse preference structure. Further EP utility parameter estimates provide evidence of decreasing absolute risk aversion (DARA) because $\hat{\alpha}<1$, and increasing relative risk aversion (IRRA) because $\hat{\beta}>0$." and "The empirical findings clearly rejected the null hypothesis of risk neutrality in favor of risk aversion among Kansas farmers. We also found evidence of decreasing absolute and increasing relative risk aversion." Thus, this application risk sensitivities estimates produce the same statistic inference and reveal preferences and degree of risk aversion as well as the experimental data do.

This application mimics the statistical inference derived from experimental data in terms of risk assessment, thanks to the estimator's convergence with estimator published values.

In general, the application estimates have achieved convergence with the experiment data results reported in Saha. All the data used in this method is synthetic and the inventor has constructed the econometric modeling design embodied in an "alternative recursive bias approach."

It is understood that this invention is not limited to the above particular application and modifications described here, as such may of course change. The econometric optimization models are general and do not typically account for the unique properties of the agriculture system to which they are applied. The terminology defined in the glossary is intended to describe particular aspects of this method, and their meaning are not intended to limit the scope of the present invention, which is limited only by the present claims. It should be acknowledge that this method and its features could be apply totally or partially on different applications and/or persons and entities, i.e., sample design; operations research, decision theory; institutional investors; investment banks; insurance companies; labor productivity assessments; welfare economics; actuary science; business management; network science; engineering; control systems; industrial plants; transportation costs; agriculture; asset pricing; public policy; healthcare management; software development; to mention a few of them. Unforeseen or unanticipated modifications or improvements of this invention features subsequently made by those skilled in the art are also intended to be encompassed by the present claims.

Glossary

Clone: synthetic data;

Cloning: mimic experimental data statistic behavior by means of synthetic data;

Control variable design: variations on synthetic data and econometric parameters to test and control risk sensitivities estimates changes and keep a system responses record.

Experimental data: data generated in the field by means of surveys;

Factor of economic activity: it adjusts the sample size by increasing or decreasing the observations number according with an economic aggregation factor. In the invention application the factor of economic activities is related with small, large and all farmers.

Output estimates nonrandom part: A$h$; a1$h$; and a2$h$ estimates;

Output estimates random part: m1$h$; and m2$h$ estimates;

Output estimates of the wealth function: alpha and beta estimates;

Output estimates of the joint estimation partial production elasticities: mmu1$h$ and mmiu5$h$;

Output estimates of the risk scenario Only CDE: A$mh$; am1$h$; am2$h$; m1$bh$; m2$bh$; mmmiu1$h$ and mmmu5$h$.

Output estimates of the risk scenario Under CARA: A5$h$; am15$h$; am25$h$; m15$h$; m25$h$; mmmiu15$h$ and mmmu25$h$.

Synthetic data: random variables that take their mean and standard deviation from experimental data. It reproduces the experimental data underlying statistic information with a statistical confidence of 99%;

Random variable: A variable whose values depend on random probabilities of occurrence of identical independent events in a distribution (i.i.d.), whose metric space belongs to a filtration of Borel sigma algebra.

I claim:

1. A method for sampling design comprising:
constructing synthetic data using a means for constructing synthetic data, said means for constructing synthetic data comprising a computer processor,
    said constructing synthetic data step further comprising,
        selecting an observations number equal to the product of a number of farmers and a number of years,
        assigning initial values for random variables, said random variables comprising capital inputs mean and standard deviation, material inputs mean and standard deviation, capital inputs price mean and standard deviation, material inputs price mean and standard deviation, exogenous income mean and standard deviation, output mean and standard deviation, said random variables having standard errors comprised of mean, scale, and shape, wherein said initial values for the random variables and their assigned initial standard errors values are taken from a published literature source,
        generating synthetic data using a means for generating random numbers with either uniform distribution or Weibull distribution, or a combination thereof,
        using a set of behavioral assumptions and adjusting the synthetic data standard deviations by a factor between one and two standard deviations from the mean thereby preventing generation of negative values,
    modifying synthetic data parameter values to construct different synthetic data sets, said modifying synthetic data parameter values further comprising at least one of,
        modification on the observations number, modification on the factor of economic activity, modification on the factor of time frequencies, modification on initial values.

2. A method for generating econometric models based on synthetic data and an alternative recursive bias approach comprising:
    estimating a synthetic data mean and standard deviation using a means for estimating said synthetic data mean and standard deviation, said means for estimating said synthetic data mean comprising a computer processor,
    said estimating step further comprising, constructing a maximum likelihood functional specification regression using a synthetic Weibull error term,
    said estimating step further comprising, computing the means for values of shape c and scale b by constructing a variance covariance matrix for the maximum likelihood regression and by calculating the inverse of the Fisher information matrix,
    constructing standard errors of shape c and scale b estimates by computing a square root of the diagonal elements of the variance covariance matrix using a Marquardt-Levenberg gradient expansion algorithm,
    estimating a synthetic dependent variable from a production function, said production further comprising a Cobb-Douglas technology functional specification further comprising,
        constructing the nonrandom part, using synthetic independent variables, said synthetic capital and materials inputs, using a non-linear least squares regression based on the Levenberg-Marquardt algorithm,
        constructing the random part,
            using synthetic independent variables, said synthetic capital and materials inputs, and Weibull adjusted nonrandom part error term based on its logarithm conditional mean,
            constructing a linear least squares for regression for a logarithm Cobb-Douglas functional specification,
    estimating a synthetic dependent variable from a utility function, said utility function further comprising an Expo-Power preference functional specification further comprising,
        constructing said synthetic wealth dependent variable, said constructing said synthetic wealth variable further comprising,
        using synthetic independent variables, said synthetic independent variables further comprising capital and material inputs, capital and materials inputs prices, exogenous income, Weibull adjusted nonrandom part error term, Cobb-Douglas estimates comprising nonrandom and random parts,
        using a non-linear least squares regression based on the Levenberg-Marquardt algorithm,
    modifying and integrating econometric models and synthetic data parameters to construct different risk scenarios comprising at least one of,
        modifying the synthetic independent variables,
            said synthetic capital and materials inputs, and error distribution b parameters for constructing risk scenario describing a CDE technology functional specification,
        modifying the synthetic independent variables,
            said alpha and beta, and error distribution b parameters for constructing risk scenario CARA utility functional specification,
        integrating Cobb-Douglas technology functional specification comprising nonrandom and random parts with the Expo-Power preference functional specification for constructing risk scenario jointly estimated.

3. A method for generating a risk sensitivities estimates set based on synthetic data comprising:
    estimating risk sensitivities for mean wealth, absolute risk aversion and relative risk aversion using a means for estimating said risk sensitivities, said means for estimating said risk sensitivities comprising a computer processor,
    said estimating step further comprising, constructing a linear least squares functional specification,
    said estimating step further comprising, using synthetic data and synthetic estimates,
    said estimating step further comprising, constructing numeric values and linear least squares functional specification optimizations, said mean wealth, absolute risk aversion and relative risk aversion,
    constructing a statistical inference based on synthetic data comprising,
        using economic decision theory values to determine preference structure on different synthetic data sample size estimates comprising,
        DARA if synthetic alpha estimate is less than one,
        IRRA if synthetic beta estimate is bigger than zero,
            using economic decision theory values to find different synthetic data sample size degree of risk aversion, comprising, using comparisons among synthetic data with different sample size for ranking them with respect to their
            $A(\overline{W})$ absolute risk aversion,
            and
            $R(\overline{W})$ relative risk aversion, using economic decision theory values to test at least one hypothesis from the group comprising an absolute risk neutrality hypothesis H0: A($\underline{W}$)=0, an increasing relative risk aversion hypothesis H0: R($\underline{W}$)>0, and a decreasing absolute risk aversion hypothesis H0: A($\underline{W}$)<0.

* * * * *